Figure 3:
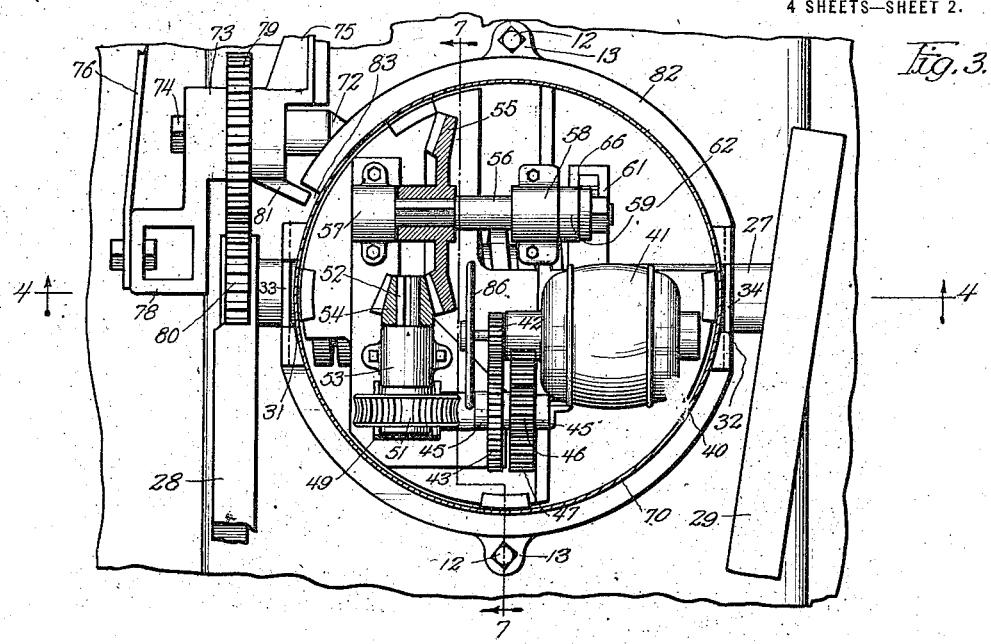

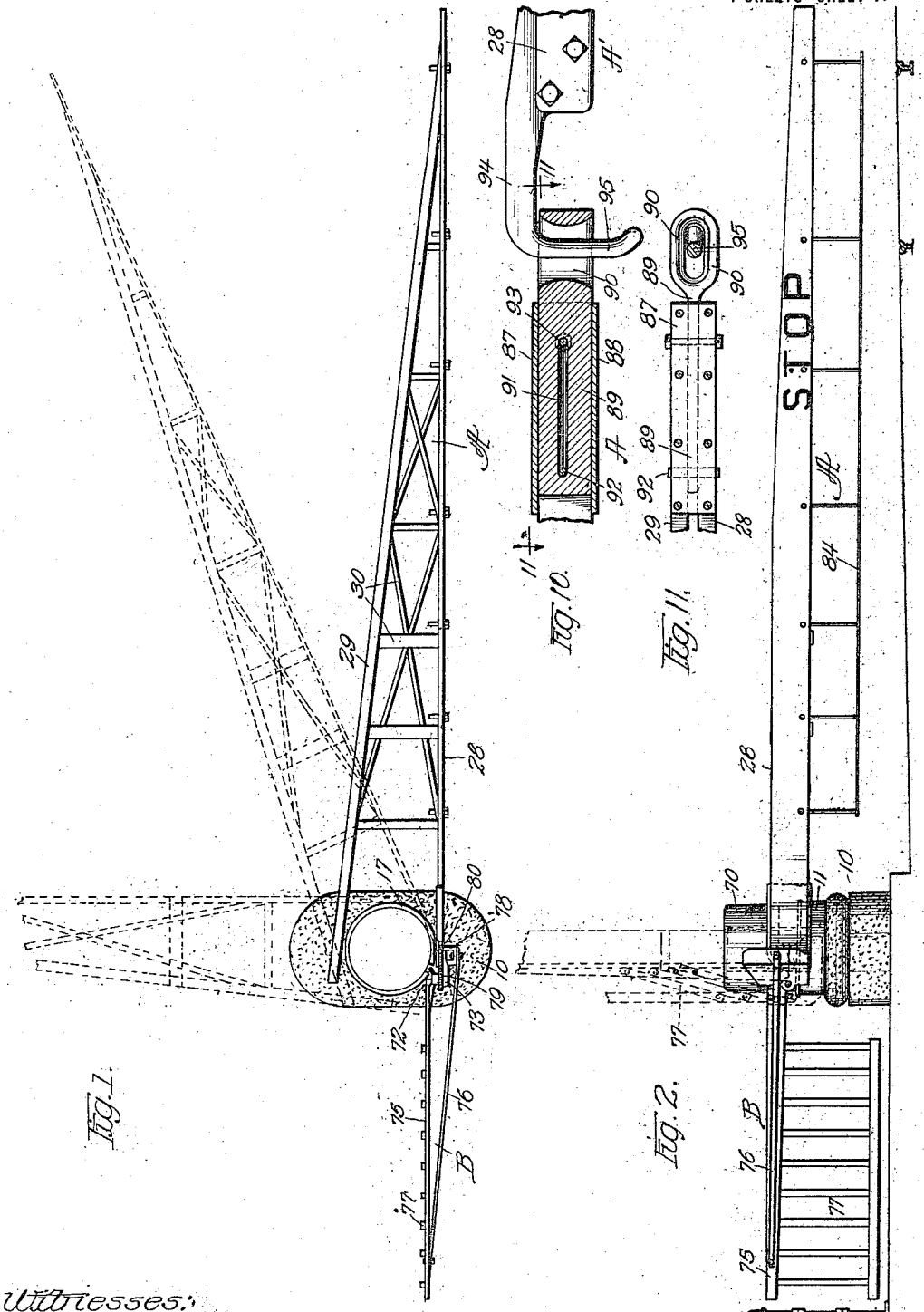

O. W. HANSEN.
BARRIER GATE.
APPLICATION FILED JUNE 9, 1917.

1,296,658.

Patented Mar. 11, 1919.
4 SHEETS—SHEET 2.

O. W. HANSEN.
BARRIER GATE.
APPLICATION FILED JUNE 9, 1917.

1,296,658.

Patented Mar. 11, 1919.
4 SHEETS—SHEET 3.

Witnesses:

Inventor
Otto W. Hansen
James R. Offield
Atty.

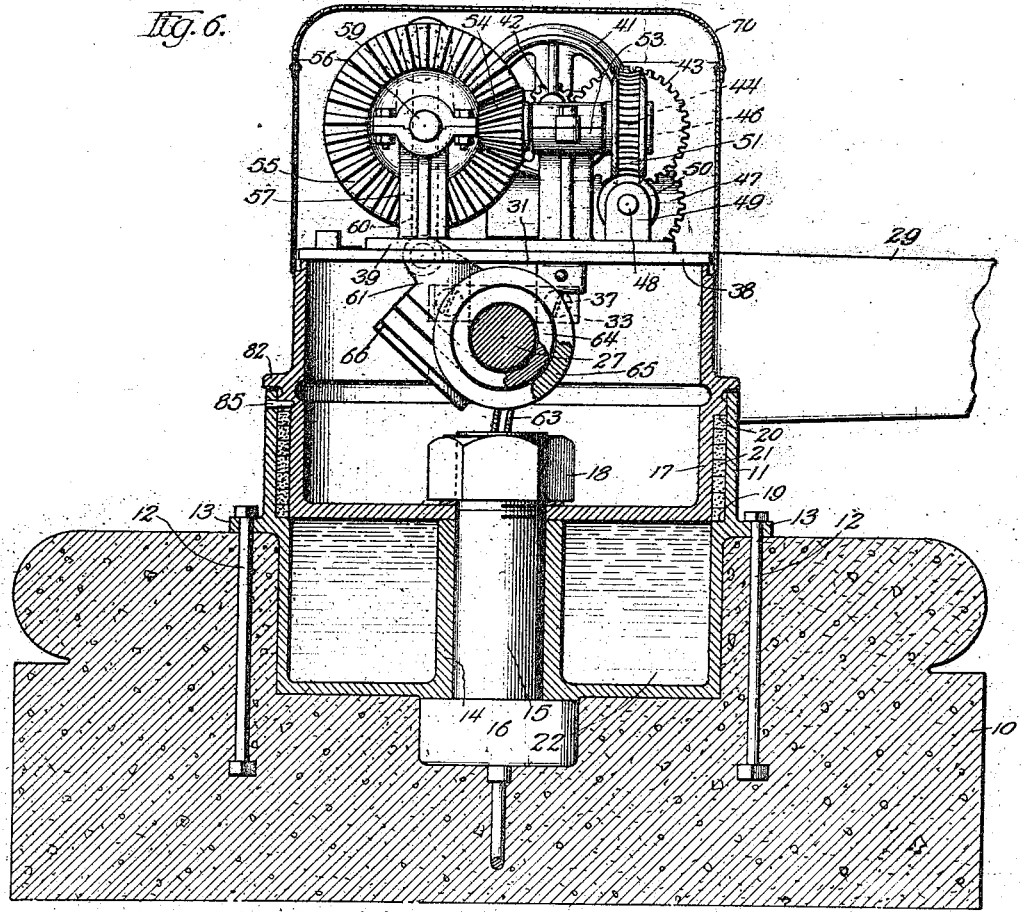
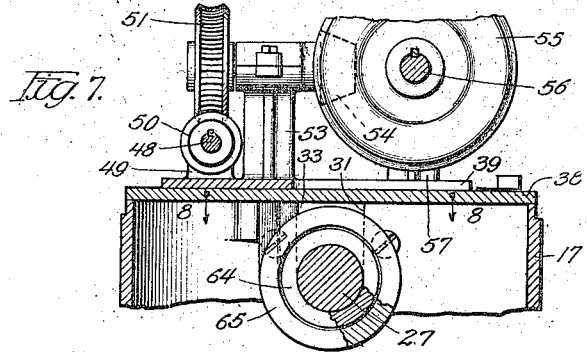
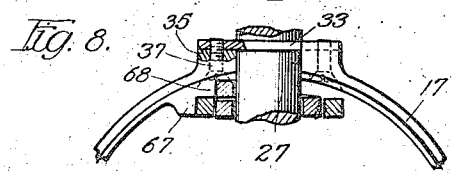

UNITED STATES PATENT OFFICE.

OTTO W. HANSEN, OF CHICAGO, ILLINOIS.

BARRIER-GATE.

1,296,658.　　　　　Specification of Letters Patent.　　Patented Mar. 11, 1919.

Application filed June 9, 1917.　Serial No. 173,750.

*To all whom it may concern:*

Be it known that I, OTTO W. HANSEN, a citizen of the United States, and a resident of Chicago, in the county of Cook and State of Illinois, have invented certain new and useful Improvements in Barrier-Gates, of which the following is a specification.

My invention relates to an improved barrier gate particularly adaptable for use at bridge approaches or at railway or other dangerous crossings.

In barrier gate structures heretofore used the gate arm was capable only of swinging in a vertical plane and when the arm was struck by a vehicle it was usually shattered and then offered no resistance to further travel of the vehicle. One of the important objects of my invention is therefore to produce a barrier gate structure at which the gate arm is not only capable of swinging in a vertical plane but is also capable of swinging in a horizontal plane against yieldable resistance such as fluid or gas pressure, or suction, the resistance being such that the gate arm cannot be swung horizontally under ordinary pressure but will yield under extraordinary pressure so that when the arm is struck by a traveling vehicle it will yield horizontally but will resist further travel of the vehicle and check its travel sufficiently to stop it or so that it may be stopped by the driver before the danger zone is reached.

Another object of the invention is to provide a compact supporting structure for the gate arm comprising a base seated in concrete and a revoluble turret thereon together with means between the turret and base for resisting turning of the turret on its vertical axis to permit horizontal swing of the gate when down. Another object of the invention is to mount the gate arm raising or lowering mechanism on the turret in such manner that it is all readily accessible for inspection or repair. Another object is to provide improved means for balancing the gate arm so as to relieve the driving mechanism from unnecessary strains and to reduce the necessary driving power to a minimum. Another object is to provide an improved driving connection between the main or street gate arm and a side-walk arm, which driving connection is readily separable when the lowered street arm is swung horizontally, and another object is to provide improved means for positively keeping the side-walk arm in its lowered position during horizontal swing of the street arm.

The above and other features of my invention are embodied in a structure which is illustrated on the accompanying drawings in which—

Figure 5:
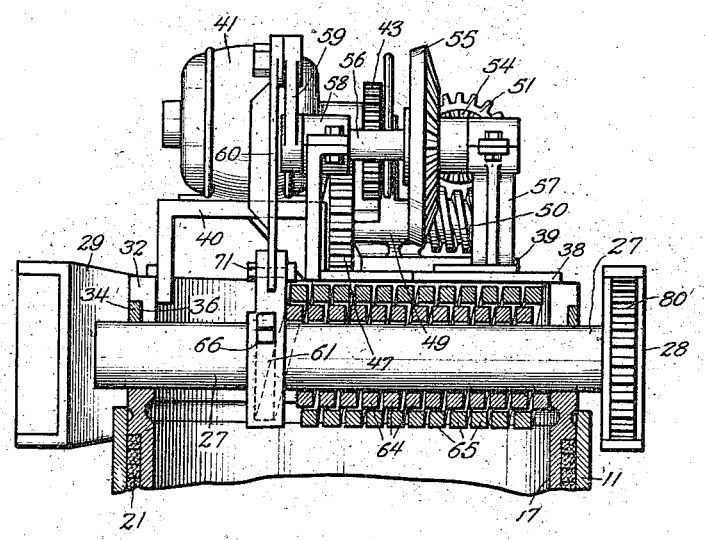
Figure 4:
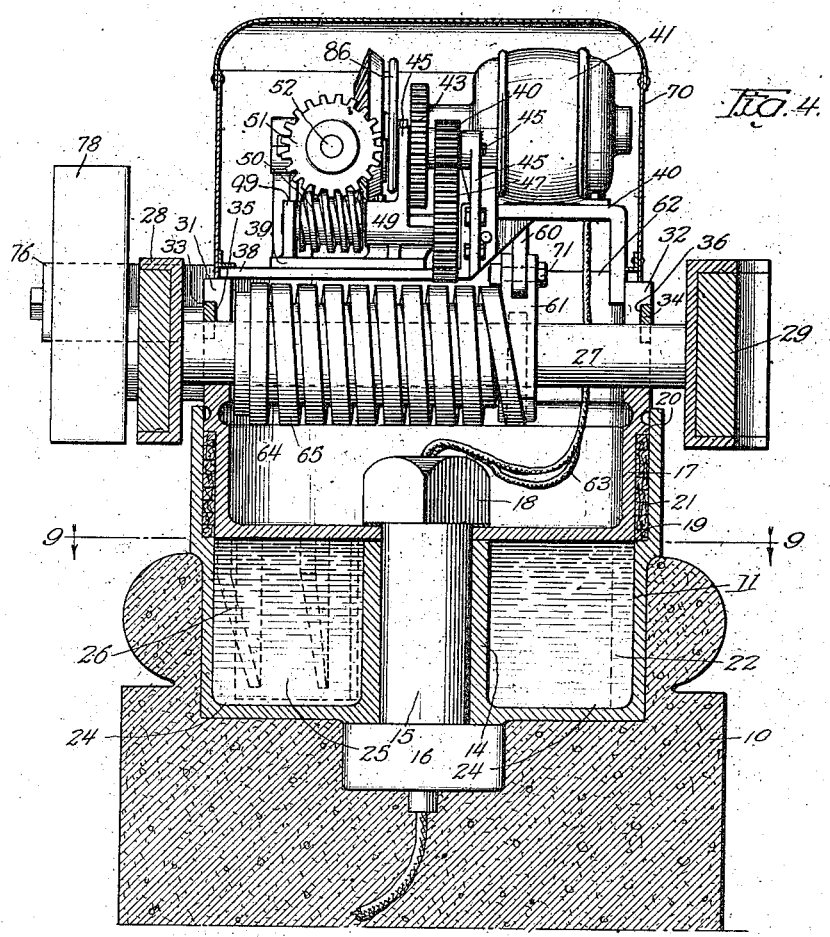
Figure 9:
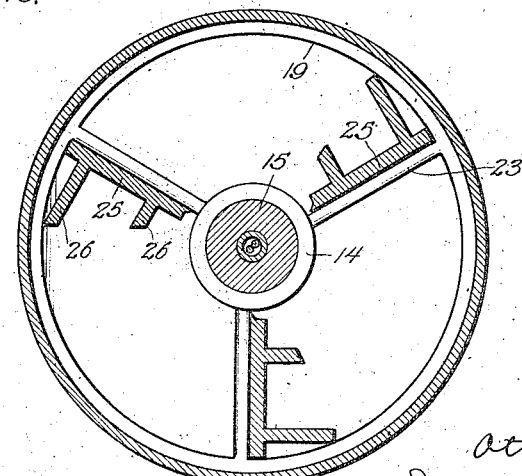

Figure 1 is a plan elevational view of a gate structure, the full lines showing the street and side-walk arms in lowered position and the dotted lines showing the intermediate and final position of the street arm when swung horizontally, Fig. 2 is a side elevational view of the gate structure with the gate arms lowered, Fig. 3 is an enlarged plan view of the gate arm supporting and controlling mechanism, the inclosing hood being broken away, Fig. 4 is an enlarged side elevational view of the driving and controlling mechanism, and the supporting base and frames shown in vertical diametral section on plane 4—4, Fig. 3, Fig. 5 is a side elevational view from the opposite side with the supporting frames and counterbalance spring in vertical diametral section, Fig. 6 is a view taken from the left of Fig. 4 with the supporting base and frames and the barrier arm shaft in vertical section, Fig. 7 is a sectional view on plane 7—7, Fig. 3, Fig. 8 is a sectional view on plane 8—8, Fig. 7, Fig. 9 is a sectional view on plane 9—9, Fig. 4, Fig. 10 is an enlarged view of the ends of opposed gate arms showing the means for connecting them yieldingly together, and Fig. 11 is a view from plane 11—11, Fig. 10.

The entire structure is supported on a concrete foundation 10 into which the cylindrical base or well 11 is partly sunk and secured by anchor rods 12 extending downwardly into the concrete from lugs 13. Extending upwardly through the base 11 is the hub 14 through which extends the pivot bolt 15 whose head 16 is embedded in the concrete. Telescoping into the upper end of the base 11 is the cylindrical turret 17 which rests on the top of the hub 14 and receives the bolt 15, the nut 18 of the bolt engaging against the turret base to hold it down but to leave it free to revolve. Between the internal annular ledge 19 on the base 11 and the external annular ledge 20 on the turret packing material 21 is inserted to be compressed when the turret is secured to the base and to prevent leakage from the base of fluid 22 contained therein. As best shown in Fig. 9, a number of radial partitions 23 subdivide the base interior into chambers 24, three such partitions and chambers being shown. Extending downwardly into these chambers from the base of the turret 17 are the blades 25 each provided with strengthening braces 26. Except for a predetermined amount of clearance or by-passageway these blades extend entirely across their respective chambers so that the resistance to turning of the turret in the base and the rate of turning is controlled by the rate of flow of the liquid through the by-passageways, the liquid entirely filling the chambers.

Extending diametrically through the turret is the shaft 27 to which the street arm structure A is secured. The arm structure is preferably constructed to be of great strength and rigidity and as shown it comprises the front beam 28 and the rear beam 29 suitably connected by braces 30. In plan view the structure is V-shaped and at their inner ends the beams 28 and 29 are secured to the ends of shaft 27 just outside of the turret. The upper end of the turret is open and the vertical bearing slots 31 and 32 are provided for receiving the shaft 27, and retaining cross plates 33 and 34 are seated in transverse grooves 35 and 36, the lower edges of the cross plates being concave to fit the top of the shaft 27, screws 37 serving to hold the plates in place, the arrangement being best shown in Figs. 4, 7 and 8. With this arrangement the gate structure A can readily be removed from the turret by removing the cross plates.

Mounted on top of the turret is the platform 38 for supporting the driving and controlling mechanism. A base 39 mounted on the platform 38 has the elevated section 40 for supporting a driving motor 41, here shown as an electric motor. The inner end of the motor shaft has secured thereto the driving pinion 42 which meshes with the gear 43 which is secured to the shaft 44 journaled in the bearing standard 45 rising from the base 39. The shaft 44 also carries a gear pinion 46 which meshes with the gear 47 on the shaft 48 which is journaled in the bearing standard 49. The shaft 48 has also the worm wheel 50 secured thereto which meshes with the worm wheel 51 secured to one end of the shaft 52 which is journaled in the bearing standard 53, the other end of said shaft having the bevel pinion 54 secured thereto which meshes with the bevel gear 55 which is mounted on shaft 56 between the bearing standards 57 and 58, this shaft 56 being parallel with the barrier arm supporting shaft 27. Secured to the outer end of the shaft 56 is the crank arm 59 which is connected by the connecting rod structure 60 with the crank frame 61 rigidly secured to the shaft 27, the platform 38 being provided with the opening 62 through which the connecting rod structure 60 extends. The various pinions and gears are so proportioned that the high speed of the electric motor is reduced and the shaft 27 slowly and powerfully turned when the motor is operated. The current for operating the motor is conducted through wires 63 which are brought up through the concrete base and through the interior of the pivot bolt 15.

In order to counterbalance the weight of the heavy gate arm structure A and to relieve the driving motor and train from excessive strains and to reduce to a minimum the power necessary for operation I preferably utilize spring means. As shown, the shaft 27 is surrounded by an inner coil spring 64 and an outer coil spring 65, the springs being one within the other. The inner ends of the springs extend into a tangential pocket 66 provided in the crank frame 61, while the outer ends of the springs engage respectively with the abutments 67 and 68 (Figs. 7 and 8). The arrangement of the springs is such that when the gate arm A swings from a vertical to a horizontal position the springs will be contracted or wound up, the increasing resistance of the springs to such contraction or winding up counteracting the increasing weight or moment as the gate arm swings downwardly. During raising of the gate arm the springs gradually retract and unwind as the weight or moment decreases, the gate arm being perfectly counterbalanced at all times. The gate arm shaft 27, being positively connected with the gearing train is positively rotated when the motor operates but the springs at all times take up the weight of the gate arm and thus relieve the gearing train of undue strain and the necessary driving power is therefore reduced to a minimum. The worm gearing in the transmission train acts as a brake and the gate arm will be readily held in any position to which it has been vertically swung.

The driving motor and the transmission train parts mounted on the platform 38 are very readily accessible for inspection or repairs and as a protection therefor a sheet metal hood 70 may be provided. When this hood is removed the bolt 71 which connects the connecting rod 60 with the crank frame 61 can be withdrawn and then the platform 38 with the motor and transmission train parts thereon can be lifted away, and then the springs and other parts within the turret are readily accessible, and the entire gate arm A can be removed by disengaging the cross plates 33 and 34.

I also show a side-walk barrier arm structure B. This structure is supported on the bracket 72 secured to the base 11, a supporting casting 73 being pivoted on the pin 74 extending from the bracket and to this casting is secured the arm beam 75, a brace 76 connecting the outer end of the beam with the casting. A collapsible fence 77 is supported from the beam 75 which hangs down when the arm is in horizontal position and which collapses when the arm is raised. The inner end 78 of the casting is enlarged to form a counterweight. Secured to the pivot pin 74 is a gear 79, and on the beam 28 of the street barrier arm A a gear 80 is secured concentric with shaft 27 and meshes with gear 79 when the arms A and B are parallel. When the arm A is swung horizontally with the turret 17 the gears become disengaged and the side-walk arm will remain in its down position across the side-walk. To prevent raising of the side-walk arm when the gears are uncoupled, a stop 81 extends inwardly from the casting 73 to coöperate with the annular flange 82 on the turret. This flange has the slot 83 which is below the stop 81 when the gears of the arms are in mesh, but as soon as the arm A is swung horizontally and the turret rotated the flange 82 will come into position under the stop and will prevent raising of the side-walk arm.

In Figs. 1 and 2 both gate arms are shown down and extending at right angles across the street and side-walk. If a vehicle approaches the street arm A and fails to stop before reaching it, it will encounter the gate and the gate will yield and will swing horizontally, but only against the resistance of the liquid flow past the blades 25 in the wells 24. This resistance will assist in stopping the vehicle before it reaches the danger zone and accidents will thus be avoided. The gate is of sufficient strength to withstand heavy and sudden pressure while at the same time the blow will be cushioned by the movement of the blades in the liquid and injury to the gate structure will be prevented. After horizontal swinging of the gate A it can readily be swung back into its normal plane. As the gate A may be struck before it has been brought entirely down I preferably suspend a chain or cable 84 from the beam 28 in which a vehicle will catch and its further progress resisted by the gate when it is swung laterally.

In the arrangement shown in Fig. 9, the gate arm A may swing horizontally through an arc of 90 degrees. In order to prevent turning of the turret under ordinary conditions I preferably connect the turret with the base 11 by a wooden dowel pin 85, this pin readily giving way when the lowered gate is subjected to extraordinary blows or pressure. I also preferably provide the shaft of the electric motor with a hand wheel 86 by means of which the transmission train may be driven should the motor suddenly become inoperative.

In Figs. 10 and 11 I show a means for yieldingly connecting together the ends of opposed gate arms A and A' of a set of gate structures. On one gate arm the front and rear beams 28 and 29 are separated by top and bottom plates 87 and 88 to leave a guide slot for a bar 89 which is provided at its outer end with an eye 90. The bar has a longitudinal slot 91 through which extend pins 92 and 93 secured to the arm beams, the pins engaging normally in the respective ends of the slot. Between the front and rear beams of the arm A' a plate 94 is secured whose downwardly extending tongue 95 is adapted to enter the eye 90 when the gate arms are lowered. Both the pins 92 and 93 may be of yielding material such as wood, but preferably only the inner pin 92 is of wood and the outer pin 93 of metal. With the arrangement shown, when the gate arms are lowered the tongue 95 passes through the eye 90, and then when one of the gate arms is struck by a traveling vehicle, this arm will first swing horizontally under resistance, and the arm A' being also swung, its horizontal swinging resistance is added. When the arms have been swung sufficiently to bring the tongue and outer end of the eye into engagement, tension will be exerted on the inner, wooden pin 92, and if the vehicle has still considerable headway and power, this pin will break and the gate arm will continue to swing until the inner end of the slot 91 encounters the metal bolt 93, and then the gate arms are rigidly locked together, and under most conditions the vehicle will be brought to a stop and accident prevented. After such shifting of the plate the gate arms can be readily swung back into parallelism and the bar 89 returned and a new pin 92 inserted. Thus a traveling vehicle will first encounter the resistance of the one gate arm, then the combined resistance of the two gate arms, and then the resistance of the wooden pin is added, and the vehicle finally brought to a stop by the engagement of the bar with the stronger outer pin 93.

I thus provide a very efficient and desirable barrier gate structure which will not only extend across an approach or street to indicate danger, but which will yield when struck by a vehicle which fails to stop and which will assist in stopping further progress of the vehicle before it reaches the danger zone. Such operation of the gate also prevents destruction thereof when it is struck by a vehicle. The arrangement of the driving and controlling parts is such that they can be readily accessible at any time for inspection or repairs or to be readily removed. The coil springs effectively and accurately counterbalance the weight and moment of the gate and the motor and transmission train parts are not strained and only a small driving source or motor is necessary, the cost of operation of the gates being thus very little.

I do not of course desire to be limited to the precise construction, arrangement, and operation disclosed, as changes and modifications can no doubt be made which would still come within the scope of the invention.

I claim as follows:

1. In a barrier gate structure, the combination of a supporting base, a turret frame mounted on said base, a gate arm pivoted to said turret frame to swing vertically, said turret frame being adapted to rotate about its vertical axis, a blade extending downwardly from said turret into said base, and fluid confined in said base for yieldingly resisting movement of said blade and thereby turning of said base by said gate arm.

2. In a barrier gate structure, the combination of a supporting base divided into a plurality of chambers containing fluid, a turret frame pivoted on said base to close said chambers, said turret frame being rotatable on its vertical axis, blades extending downwardly from said turret frame into said fluid chambers to coöperate with said fluid to resist turning of said turret structure, a gate arm pivoted to said turret frame to swing vertically thereon, said rotatable turret frame permitting horizontal swing of the gate arm when it is down.

3. In a barrier gate structure, the combination of a cylindrical supporting base, a plurality of radial partitions sub-dividing the interior of said base into compartments, a turret frame pivoted on said base and closing said compartments, said compartments being filled with fluid, blades extending downwardly from the turret frame into said compartments and extending entirely across the respective compartments except for limited by-passageway whereby turning of said turret frame will be resisted, a horizontal shaft journaled in said turret frame, a gate arm mounted on said shaft to swing vertically, a driving motor supported on said turret frame, and a transmission train connecting said motor with said shaft.

4. In a barrier gate structure, the combination of a hollow cylindrical supporting frame, a shaft extending diametrally through said frame and journaled thereon, a gate arm secured at one end to said shaft to be swung vertically, a top for said frame, a motor mounted on said top, a transmission train supported on said top and connected at one end with said motor and at its other end with said shaft whereby said shaft can be rotated to swing the gate arm either down or up, and spring counterbalance mechanism within said frame for counterbalancing the weight of said gate.

5. In a barrier gate structure, the combination of a supporting base, a frame pivoted on said base for rotation on its vertical axis, a main gate arm extending from said frame to be swung laterally therewith, said gate arm being pivoted to the frame to swing vertically thereon, an auxiliary gate arm pivoted on said base to swing vertically, and a driving connection between said arms adapted to be broken when said main arm swings horizontally.

6. In a barrier gate structure, the combination of a stationary supporting base, a frame pivoted on said base for rotation on its vertical axis, a main gate arm pivoted on said frame to swing laterally therewith and to swing vertically with reference thereto, driving means connected with said main gate arm for causing vertical swing thereof, an auxiliary gate arm pivoted on said base to swing vertically, driving mechanism for swinging said auxiliary gate arm, and means for disconnecting said driving mechanism from said auxiliary gate arm when said main gate arm is swung laterally.

7. In a barrier gate structure, the combination of a supporting base, a turret frame mounted on said base, a gate arm pivoted on said turret frame to swing vertically, said turret frame being adapted to rotate about its vertical axis, and fluid brake mechanism for resisting rotation of said turret.

8. In a barrier gate structure, the combination of a hollow supporting frame, a shaft extending transversely through said frame and beyond the sides thereof, a gate arm secured to the outer ends of said shaft, a platform mounted on top of said frame above said shaft, a motor and driving transmission mechanism on said platform, a link extending through said platform for detachably connecting said transmission mechanism with said shaft, disconnection of said link permitting said platform to be removed from said frame.

9. In a barrier gate structure, the combination of a hollow supporting frame, a shaft extending transversely through said frame and beyond the sides thereof, a gate arm secured to the outer ends of said shaft, a platform mounted on top of said frame above said shaft, a motor and driving transmission mechanism on said platform, a crank arm on said shaft, a link extending from said transmission mechanism and connected with said crank arm, and a counterbalance spring encircling said shaft and anchored at its ends respectively to said crank arm and said frame.

10. In a barrier gate structure, the combination of a hollow supporting frame having vertical slots in its opposite sides extending downwardly from the top thereof, a shaft extending through said frame and journaled in said slots, removable cross-plates spanning said slots above said shaft to hold the shaft in the slots, a gate arm secured to the outer ends of the shaft, a platform bridging across the top of said frame, a driving motor, and a transmission train mounted on said platform, a crank arm on said shaft, a link extending from said transmission train and having detachable connection with said crank arm, disconnection of said link from said crank arm permitting said platform with the motor and transmission train thereon to be removed from the frame, and removal of said cross plates then permitting said shaft to be raised out of said slots.

In witness whereof I hereunto subscribe my name this 5th day of June, A. D., 1917.

OTTO W. HANSEN.